(12) United States Patent
Han

(10) Patent No.: US 11,003,474 B2
(45) Date of Patent: May 11, 2021

(54) SEMICONDUCTOR DEVICE FOR PROVIDING A VIRTUALIZATION TECHNIQUE

(71) Applicant: SAMSUNG ELECTRONICS CO., LTD., Suwon-si (KR)

(72) Inventor: Jong-Hun Han, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 16 days.

(21) Appl. No.: 16/255,275

(22) Filed: Jan. 23, 2019

(65) Prior Publication Data
US 2019/0370041 A1    Dec. 5, 2019

(30) Foreign Application Priority Data

Jun. 4, 2018   (KR) .......................... 10-2018-0064071

(51) Int. Cl.
  *G06F 9/455*   (2018.01)
  *G06F 9/30*    (2018.01)
(52) U.S. Cl.
  CPC ...... *G06F 9/45545* (2013.01); *G06F 9/30101* (2013.01)
(58) Field of Classification Search
  CPC .................................................. G06F 9/45545
  See application file for complete search history.

(56) References Cited

U.S. PATENT DOCUMENTS

| | | | |
|---|---|---|---|
| 8,527,673 | B2 | 9/2013 | Mahalingam et al. |
| 9,424,211 | B2 | 8/2016 | Bogin et al. |
| 9,430,254 | B2 | 8/2016 | Mitsugi et al. |
| 9,632,953 | B2 | 4/2017 | Shacham et al. |
| 2012/0167082 | A1 | 6/2012 | Kumar et al. |
| 2014/0229648 | A1 | 8/2014 | Tsirkin et al. |
| 2014/0282514 | A1* | 9/2014 | Carson ............... G06F 9/45533 718/1 |
| 2016/0085568 | A1 | 3/2016 | Dupre et al. |
| 2016/0266923 | A1* | 9/2016 | Miyoshi ............. G06F 12/109 |
| 2017/0286325 | A1* | 10/2017 | Singh ................ G06F 12/1466 |
| 2018/0101319 | A1* | 4/2018 | Zhou ..................... G06F 5/065 |

\* cited by examiner

*Primary Examiner* — Sisley N Kim
(74) *Attorney, Agent, or Firm* — Sughrue Mion, PLLC

(57) ABSTRACT

Provided are semiconductor devices. A semiconductor device includes a processor which provides a virtualization function for a physical device to a first guest operating system and a second guest operating system; and an SFR (Special Function Register) which is electrically connected to the processor, and includes a first region allocated to the first guest operating system and a second region allocated to the second guest operating system, wherein information on a first data access request provided from the first guest operating system is stored in the first region, and information on a second data access request provided from the second guest operating system is stored in the second region, and the processor generates a first interrupt and a second interrupt designated to the first guest operating system and the second guest operating system, respectively, in response to the first data access request and the second data access request.

18 Claims, 13 Drawing Sheets

SEMICONDUCTOR DEVICE FOR PROVIDING A VIRTUALIZATION TECHNIQUE

CROSS-REFERENCE TO RELATED APPLICATION

This application claims priority from Korean Patent Application No. 10-2018-0064071, filed on Jun. 4, 2018, in the Korean Intellectual Property Office, the disclosure of which is herein incorporated by reference in its entirety.

BACKGROUND

1. Field

The present disclosure relates to a semiconductor device, and more specifically, to a semiconductor device that provides a virtualization technique.

2. Description of the Related Art

Virtualization may allow a physical device to be made available to multiple guest operating systems. Virtualization may be implemented as a full-virtualization technique capable of providing an environment in which the guest operating system directly controls a physical device, or as a para-virtualization technique which requires an intermediate operating system between the guest operating system and the physical device for processing a request for access to the physical device by the guest operating system.

The full-virtualization technique has a great advantage in that there is no need for modification of a kernel of the guest operating system, unlike the para-virtualization technique. However, in order to ensure extensibility such as a support of disparate types and numbers of guest operating systems, implementation complexity and cost may increase accordingly. In particular, in a case where it is not as important to ensure extensibility such as in an automotive environment in which the number of guest operating systems is comparatively limited, there is a need for providing the full-virtualization technique at reduced implementation complexity and cost.

SUMMARY

Aspects of the present disclosure provide a semiconductor device which provides a full-virtualization technique in which the implementation complexity and the cost are lowered.

The aspects of the present disclosure are not restricted to those mentioned above and another aspect which is not mentioned is clearly understood to the ordinary technician in the technical field from the description below.

According to an aspect of the present disclosure, there is provided a semiconductor device including a processor configured to provide a virtualization function for a physical device to a first guest operating system and a second guest operating system; and a special function register (SFR) electrically connected to the processor, the SFR including a first region allocated to the first guest operating system and a second region allocated to the second guest operating system. Information on a first data access request provided from the first guest operating system is stored in the first region, and information on a second data access request provided from the second guest operating system may be stored in the second region. The processor may be further configured to generate a first interrupt and a second interrupt designated to the first guest operating system and the second guest operating system, respectively, in response to the first data access request and the second data access request.

According to another aspect of the present disclosure, there is provided a semiconductor device including a processor configured to provide a virtualization function for a physical device to a first guest operating system and a second guest operating system; a special function register (SFR) electrically connected to the processor, the SFR including a first region allocated to the first guest operating system and a second region allocated to the second guest operating system; and an internal memory electrically connected to the SFR. A first address of the internal memory and a second address of the internal memory different from the first address may be stored in the first region and the second region. Information on the first data access request may be stored in a region accessible at the first address of the internal memory. Information on the second data access request may be stored in a region accessible at the second address of the internal memory. The processor may generate a first interrupt and a second interrupt designated to each of the first guest operating system and the second guest operating system, respectively, in response to the first data access request and the second data access request.

According to still another aspect of the present disclosure, there is provided a semiconductor device including a processor configured to provide a virtualization function for a physical device to a first guest operating system and a second guest operating system; a special function register (SFR) electrically connected to the processor and including a first region allocated to the first guest operating system and a second region allocated to the second guest operating system; and an external memory electrically connected to the SFR. A first address of the external memory and a second address of the external memory different from the first address may be stored in the first region and the second region. Information on the first data access request may be stored in a region accessible at the first address of the external memory Information on the second input/output request may be stored in a region accessible at the second address of the external memory. The processor may be further configured to generate a first interrupt and a second interrupt designated to each of the first guest operating system and the second guest operating system, respectively, in response to the first data access request and the second data access request.

BRIEF DESCRIPTION OF THE DRAWINGS

The above and/or other aspects and features of the present disclosure will become more apparent by describing in detail example embodiments thereof with reference to the attached drawings, in which.

DETAILED DESCRIPTION OF THE EMBODIMENTS

Figure 1:
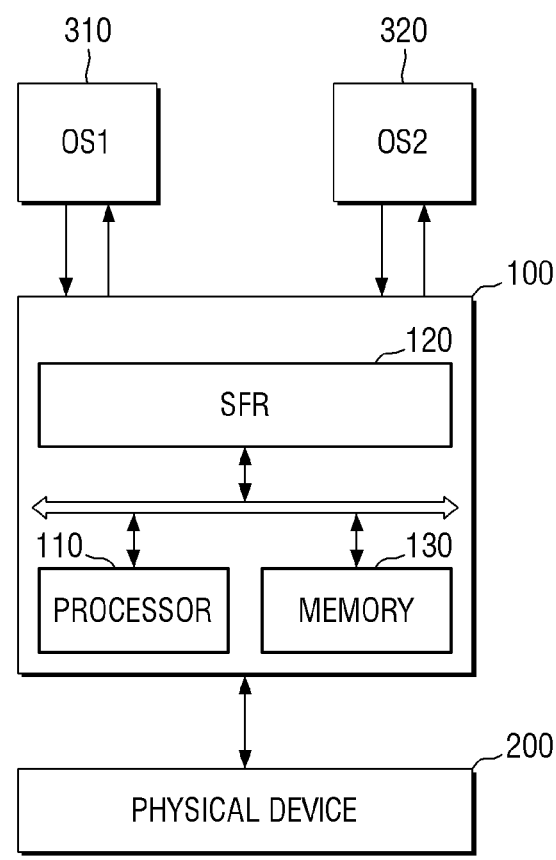
FIG. 1 is a block diagram for explaining a semiconductor device according to an embodiment of the present disclosure.

Reference will now be made in detail to example embodiments, with reference to the accompanying drawings. In the drawings, parts irrelevant to the description are omitted to clearly describe the exemplary embodiments, and like reference numerals refer to like elements throughout the specification. In this regard, the present example embodiments may have different forms and should not be construed as being limited to the descriptions set forth herein.

Throughout the specification, when it is described that a certain element is "connected" to another element, it should be understood that the certain element may be "directly connected" to another element or "electrically connected" to another element via another element in the middle. In addition, when a component "includes" an element, unless there is another opposite description thereto, it should be understood that the component does not exclude another element but may further include another element.

As used herein, the term "and/or" includes any and all combinations of one or more of the associated listed items. Expressions such as "at least one of," when preceding a list of elements, modify the entire list of elements and do not modify the individual elements of the list.

It will be apparent that though the terms first, second, third, etc. may be used herein to describe various members, components, regions, layers, and/or sections, these members, components, regions, layers, and/or sections should not be limited by these terms. These terms are only used to distinguish one member, component, region, layer, or section from another region, layer, or section and do not necessarily imply order or priority unless stated otherwise. Thus, a first member, component, region, layer, or section discussed below could be termed a second member, component, region, layer, or section without departing from the teachings of the example embodiments.

Hereinafter, the present disclosure is described in detail with reference to the accompanying drawings.

FIG. 1 is a block diagram for explaining a semiconductor device according to an embodiment of the present disclosure.

Referring to FIG. 1, a semiconductor device 100 according to an embodiment of the present disclosure includes a processor 110, a special function register (SFR) 120, and an internal memory 130. The processor 110, the SFR 120, and the internal memory 130 are electrically connected to each other via a bus. In the present embodiment, the semiconductor device 100 is illustrated as including the internal memory 130, but the scope of the present disclosure is not limited thereto, and the internal memory 130 may be omitted or located outside the semiconductor device 100 as an external memory, depending on the implementation.

First, a physical device 200 is a device which a first guest operating system 310 and a second guest operating system 320 may access via the semiconductor device 100 which provide the virtualization function. The physical device 200 may be one or more of various kinds of storage devices including, for example, a hard disk drive (HDD), an solid-state drive (SSD), and the like. However, the scope of the present disclosure is not limited thereto, and the physical device 200 may include any peripheral device required by the first guest operating system 310 and the second guest operating system 320.

The guest operating systems 310 and 320 may include any operating system that controls the resources of the physical device 200 via the semiconductor device 100. For example, the guest operating systems 310 and 30 may include any operating system such as Windows, MacOS, UNIX, Linux, Android, iOS, and Symbian.

The processor 110 may execute the software or the program to control the SFR 120, the internal memory 130, and other components (e.g., hardware or software components) of the semiconductor device 100 connected to the processor 110, and may perform various data processes and operations. In particular, in this embodiment, the processor 110 may provide the virtualization function of the physical device 200 to the first guest operating system 310 and the second guest operating system 320. The processor 110 may include, for example, a central processing unit (CPU), an application processor (AP), and the like.

In some embodiments of the present disclosure, the semiconductor device 100 according to an embodiment of the present disclosure may further include a coprocessor which is operable independently of the processor 110 or operable in conjunction with the processor 110. For example, the coprocessor may include a graphics processing unit (GPU), an image signal processor (ISP), a sensor hub processor, a communications processor (CP), and the like. In some embodiments of the present disclosure, the coprocessor may be configured to consume less power than the processor 110 or perform specific functions. On the other hand, in some embodiments of the present disclosure, the coprocessor may be implemented separately from the processor 110 or as a part of the main processor 110.

The SFR 120 is a register that is electrically connected to the processor 110 and is used for a specific purpose. In some embodiments of the present disclosure, the SFR 120 may be implemented as a static random access memory (SRAM), but the scope of the present disclosure is not limited thereto. In particular, in this embodiment, the SFR 120 may be used to store input/output requests (i.e., data access requests) provided from the first guest operating system 310 and the second guest operating system 320.

Specifically, the first guest operating system 310 and the second guest operating system 320 may store the input/output requests on the SFR 120 to perform the data operation of the physical device 200. Then, in accordance with the input/output request stored in the SFR 120, the processor 110 processes the input/output request for the physical device 200, and then may generate interrupt for reporting the completion of the work to the first guest operating system 310 and the second guest operating system 320. In this way, the first guest operating system 310 and the second guest operating system 320 may perform the data operation of the physical device 200 through the virtualization function provided by the semiconductor device 100. Therefore, the first guest operating system 310 and the second guest operating system 320 may share the physical device 200.

In the virtualization technique that operates in such a manner, the semiconductor device 100 may provide the first guest operating system 310 and the second guest operating system 320 with an environment which directly controls the physical device 200, that is, a full-virtualization environment. In order to support a wide variety of types and number of guest operating systems, the scale of extensibility that the semiconductor device 100 is capable of supporting may become a problem. In an environment in which the types of guest operating systems are extremely varied and the number thereof is large, a wide range of extensibility is required, but in an environment in which the types of guest operating systems are limited and the number thereof is small, the importance of extensibility may not be as high.

The semiconductor device 100 according to various embodiments of the present disclosure described herein focuses on provision of a full-virtualization technique in which the implementation complexity and cost are lowered in an environment in which the importance of extensibility is not high.

To this end, the SFR 120 of the semiconductor device 100 according to an embodiment of the present disclosure has a plurality of regions allocated internally and separately for each guest operating system, and the semiconductor device 100 individually provides the guest operating systems with multiple interrupts designated separately and independently for each guest operating system.

A procedure of executing the data operation of the guest operating systems 310 and 320 via the semiconductor device 100 will be described with reference to FIGS. 2 to 6.

FIGS. 2 to 6 are block diagrams for explaining the operation of the semiconductor device 100 of FIG. 1.

Figure 2:
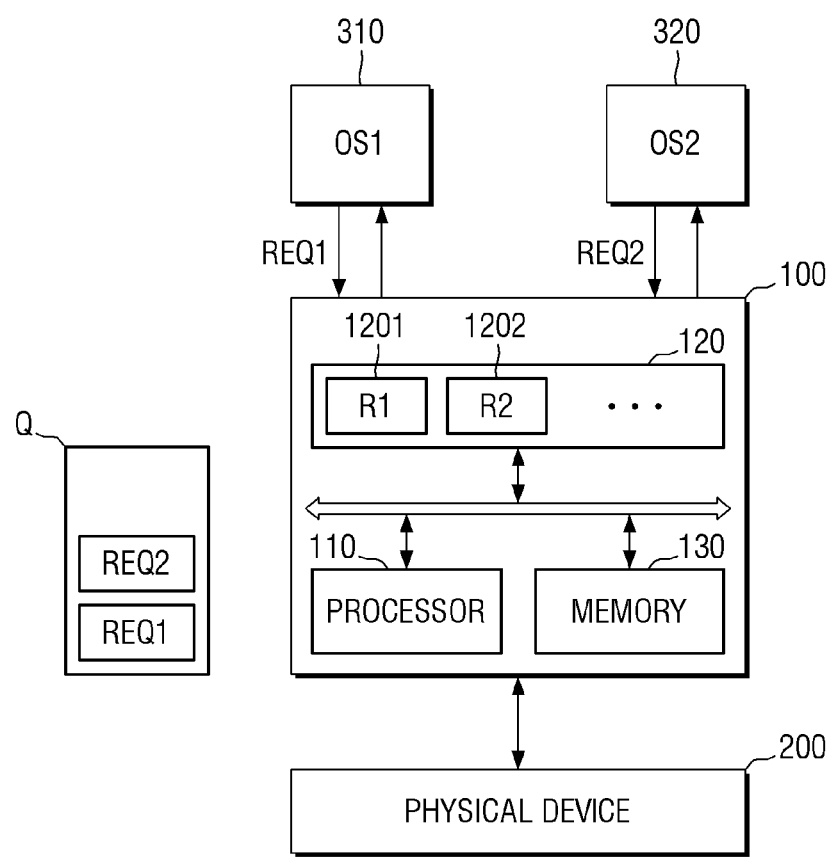
FIGS. 2, 3, 4, 5, and 6 are block diagrams for explaining an operation of the semiconductor device of FIG. 1.

Referring to FIG. 2, the SFR 120 includes a first region 1201 and a second region 1202. The second region 1202 is distinguished (e.g., physically and/or logically separated) from the first region 1201. Specifically, the first region 1201 is a region allocated to the first guest operating system 310, and the second region 1202 is a region allocated to the second guest operating system 320.

Information on the first input/output request REQ1 provided from the first guest operating system 310 may be stored in the first region 1201. Here, the first input/output request REQ1 may include the data read request, the data write request, and the like of the physical device 200. That is, by storing the information on the first input/output request REQ1 in the first region 1201, the first guest operating system 310 may access the physical device 200 by means of the first input/output request REQ1.

On the other hand, information on the second input/output request REQ2 provided from the second guest operating system 320 may be stored in the second region 1202. Here, like the first input/output request REQ1, the second input/output request REQ2 may include a data read request, a data write request, or the like for the physical device 200. That is, by storing the information on the second input/output request REQ2 in the second region 1202, the second guest operating system 320 may access the physical device 200 by means of the second input/output request REQ2.

In this embodiment, the form of information on the first input/output request REQ1 or information on the second input/output request REQ2 may vary, depending on the implementation. For example, the first region 1201 or the second region 1202 may store individual commands themselves of the first input/output request REQ1 or the second input/output request REQ2 or information in the form of an arbitrary type of identification letters or codes corresponding thereto, and its specific implementation method is not limited to a specific method as long as the information may identify the contents (e.g., request type, size, data, parameters, etc.) of the first input/output request REQ1 or the second input/output request REQ2. In the present embodiment, information on the first input/output request REQ1 is indicated as "R1" and information on the second input/output request REQ2 is indicated as "R2."

In the embodiment of FIG. 2, the first guest operating system 310 transmits the first input/output request REQ1 for accessing the physical device 200 to the semiconductor device 100, and the second guest operating system 320 transmits the second input/output request REQ2 for accessing the physical device 200 to the semiconductor device 100.

As a result, "R1" is stored as information on the first input/output request REQ1 in the first region 1201 of the SFR 120, and "R2" is stored as information on the second input/output request REQ2 in the second region 1202.

The processor 110 may determine the order of processing of the first input/output request REQ1 and the second input/output request REQ2. Specifically, for example, when a time point at which information R1 on the first input/output request REQ1 is stored in the first region 1201 of the SFR 120 is earlier than a time point at which information R2 on the second input/output request REQ2 is stored in the second region 1202, the processor 110 may process the first input/output request REQ1 earlier than the second input/output request REQ2

To this end, in order to determine the priority order of the processing of the first input/output request REQ1 and the second input/output request REQ2, the processor 110 may use a queue Q.

For example, when a time point at which information R1 on the first input/output request REQ1 is stored in the first region 1201 of the SFR 120 is earlier than a time point at which the second information R2 on the second input/output request REQ2 is stored in the second region 1202, the first input/output request REQ1 may be inserted into the queue Q earlier than the second input/output request REQ2. As it will be described later in FIGS. 3 to 6, the first input/output request REQ1 may be deleted from the queue Q earlier than the second input/output request REQ2.

Figure 3:
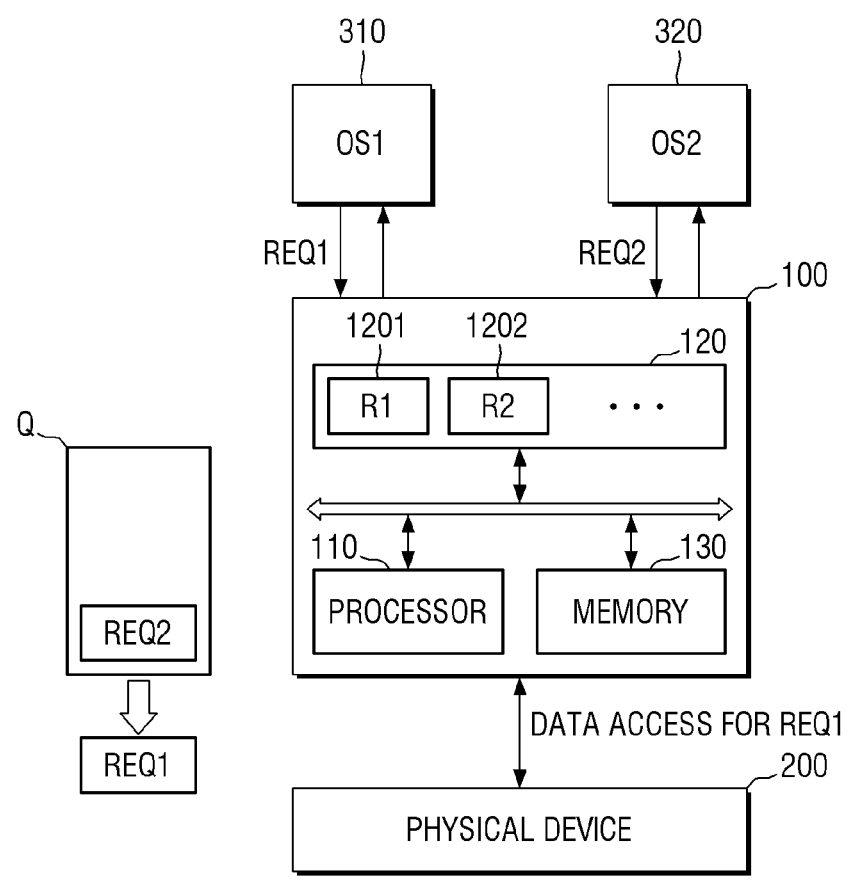

Referring to FIG. 3, the processor 110 first processes the first input/output request REQ1 having higher priority of processing. Subsequently, the first input/output request REQ1 is deleted from the queue Q.

Specifically, the processor 110 accesses the physical device 200 in accordance with the first input/output request REQ1. When the first input/output request REQ1 is a data read operation, the processor 110 reads the request data, which is transmitted as the first input/output request REQ1 from the first guest operating system 310, from the physical device 200. The read data is stored in another component, such as the internal memory 130, and then the read data may be transmitted to the first guest operating system 310. In contrast, when the first input/output request REQ1 is a data write operation, the processor 110 writes data, which is transmitted from the first guest operating system 310 together with the first input/output request REQ1, on the physical device 200.

Figure 4:
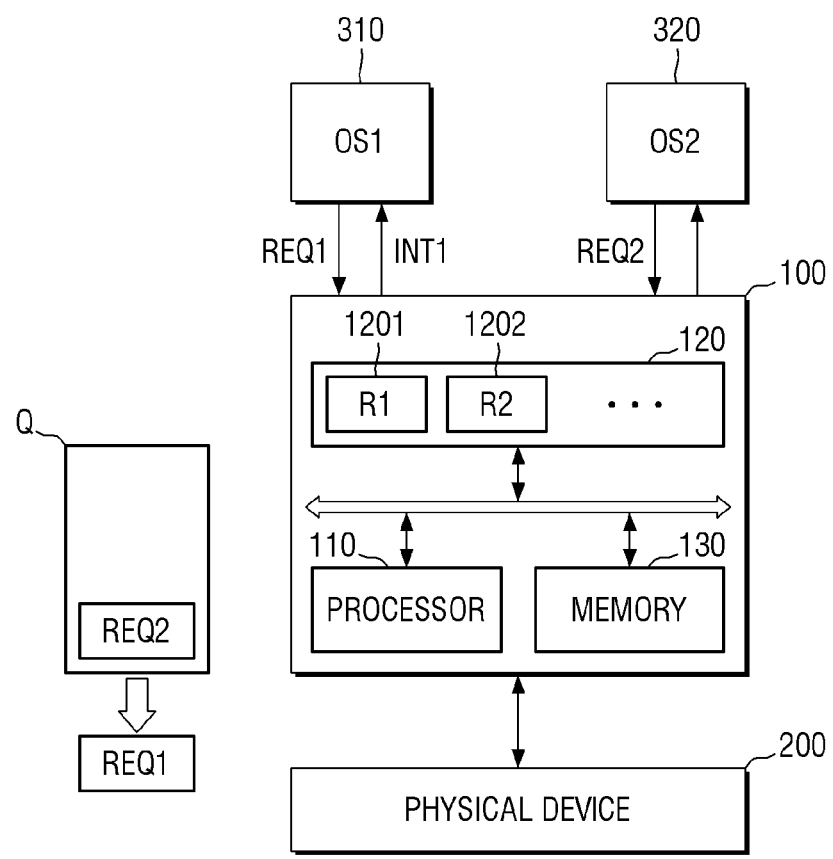

Next, referring to FIG. 4, after completing an access to the physical device 200, the processor 110 generates a first interrupt INT1 designated to the first guest operating system 310. Further, the processor 110 provides the first interrupt INT1, which was generated after processing the first input/output request REQ1 on the physical device 200, to the first guest operating system 310. As the first guest operating system 310 receives the first interrupt INT1, the first guest operating system 310 may recognize that the first input/output request REQ1 is completely processed.

Figure 5:
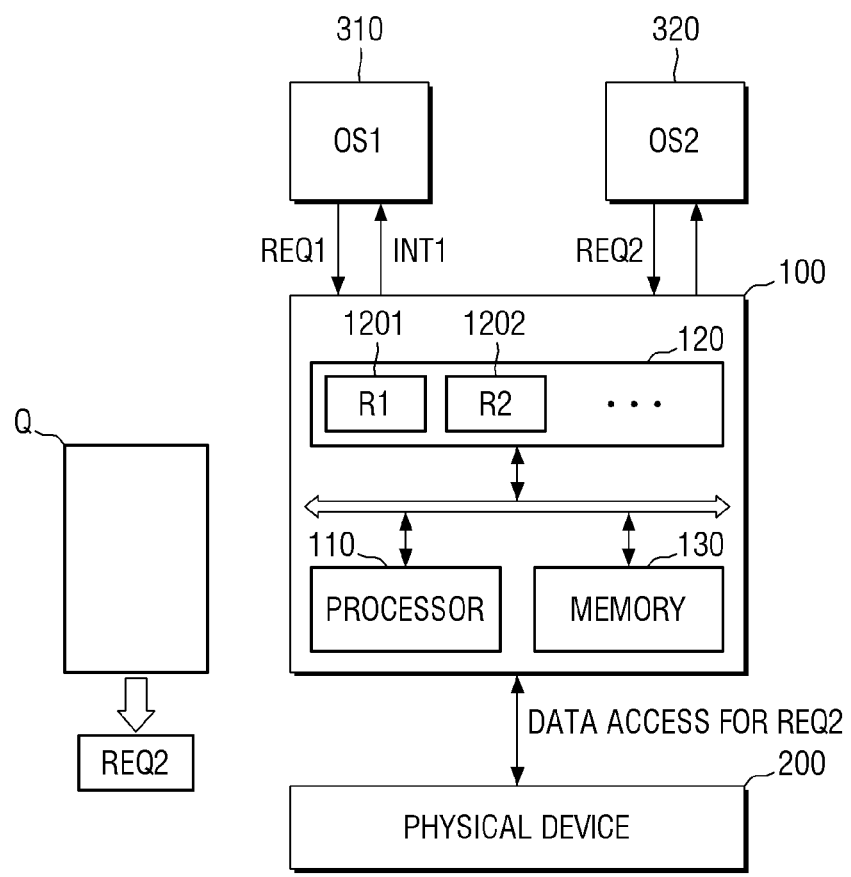

Subsequently, referring to FIG. 5, the processor 110 processes the second input/output request REQ2 having the priority of processing lower than the first input/output request REQ1. Subsequently, the second input/output request REQ2 is deleted from the queue Q.

Specifically, the processor 110 accesses the physical device 200 in accordance with the second input/output request REQ2. When the second input/output request REQ2 is a data read operation, the processor 110 reads the request data, which is transmitted as the second input/output request REQ2 from the second guest operating system 320, from the physical device 200. The read data is stored in other components, such as the internal memory 130, and then, the read data may be transmitted to the second guest operating system 320. In contrast, when the second input/output request REQ2 is a data write operation, the processor 110 writes the data, which is transferred from the second guest operating system 320 together with the second input/output request REQ2, on the physical device 200.

Figure 6:
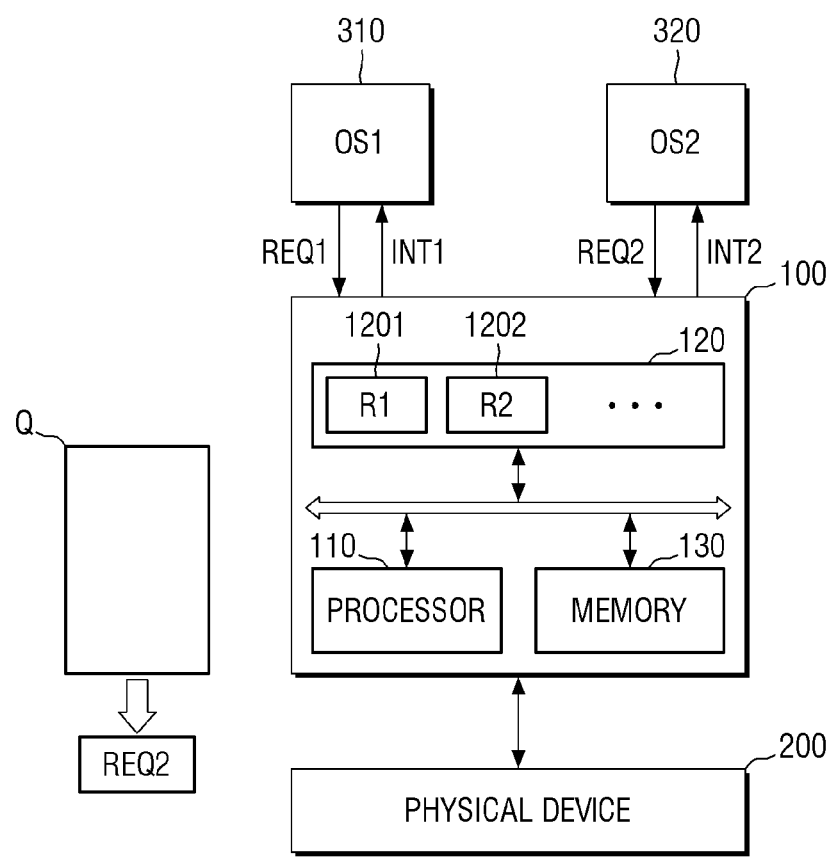

Next, referring to FIG. 6, after completing an access to the physical device 200, the processor 110 generates a second interrupt INT2 designated to the second guest operating system 320. Further, the processor 110 provides the second interrupt INT2, which is generated after processing the second input/output request REQ2 on the physical device 200, to the second guest operating system 320. As the second guest operating system 320 receives the second interrupt INT2, the second guest operating system 320 may recognize that the second input/output request REQ2 is completely processed.

Although only two guest operating systems 310 and 320 are illustrated in FIGS. 2 to 6 for convenience of explanation, the number of guest operating systems is not limited thereto. That is, unlike the illustrated case, the number of guest operating systems may be three or more. As a result, the SFR 120 may be divided into three or more different regions, and the semiconductor device 100 may generate three or more mutually independent interrupts.

According to FIGS. 2 to 6, information R2 on the first input/output request REQ1 and the second input/output request REQ2 provided from each of the first guest operating system 310 and the second guest operating system 320 is stored in the first region 1201 and the second region 1202 of the SFR 120. Further, the processor 110 generates each of the first interrupt INT1 and the second interrupt INT2 designated to each of the first guest operating system 310 and the second guest operating system 320 in accordance with the first input/output request REQ1 and the second input/output request REQ2. Specifically, after processing the first input/output request REQ1 on the physical device 200, the processor 110 provides the first interrupt INT1 to the first guest operating system 310, and processing the second input/output request REQ2 on the physical device 200, the processor 110 provides the second interrupt INT2 to the second guest operating system 320.

Further, the processor 110 may first process the first input/output request REQ1 having the higher priority of the processing in the physical device 200 using the queue Q to provide the first interrupt INT1 to the first guest operating system 310, then may process the second input/output request REQ2 having a lower priority of processing in the physical device 200 to provide the second interrupt INT2 to the second guest operating system 320.

In this way, the semiconductor device 100 according to an embodiment of the present disclosure may define a plurality of regions 1201 and 1202 allocated separately for each of the guest operating systems 310 and 320 inside the SFR 120, and may individually provide a plurality of interrupts INT1 and INT2 divided and specified for each of the guest operating systems 310 and 320 to the guest operating system, thereby providing a full-virtualization technique in which the implementation complexity and cost are lowered.

Now, a process of executing the data operation of the guest operating systems 310 and 320 via the semiconductor device 100 according to another embodiment of the present disclosure will be described referring to FIGS. 7 to 9.

Figure 7:
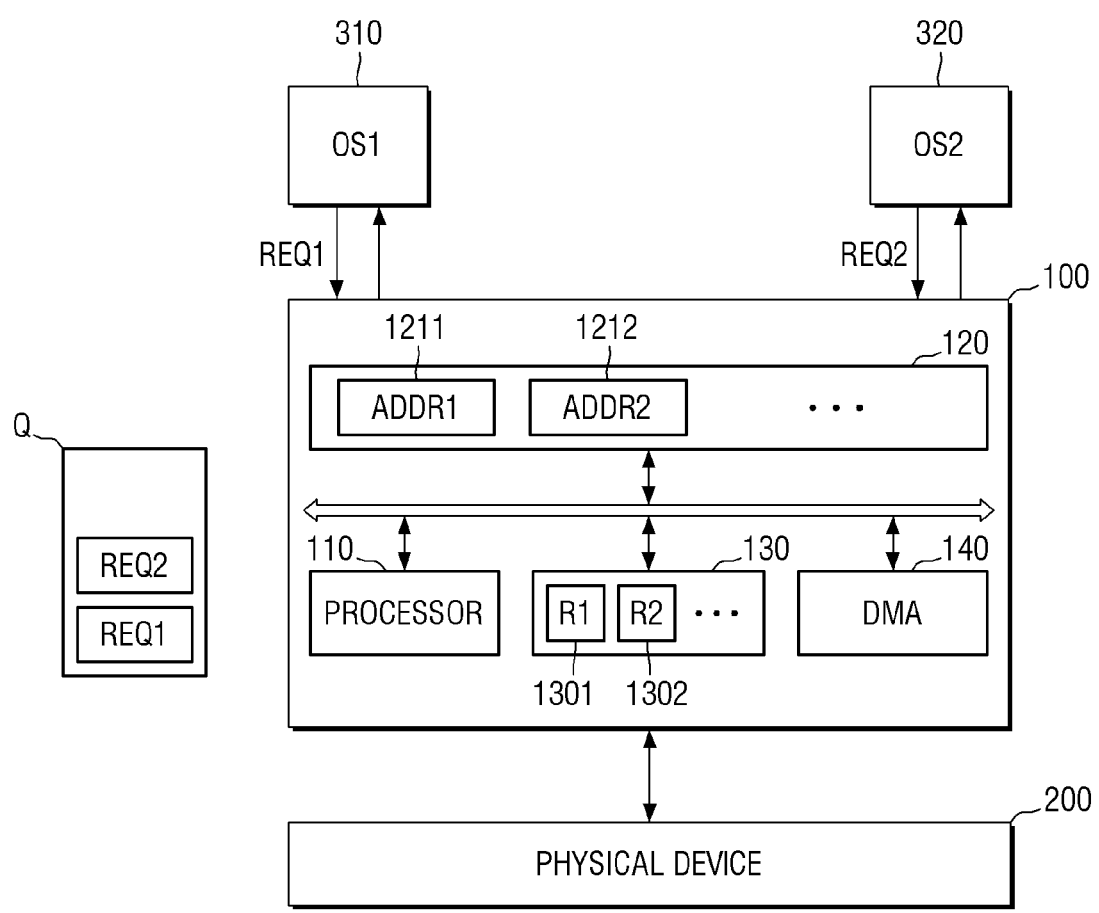
FIG. 7 is a block diagram for explaining a semiconductor device according to an embodiment of the present disclosure.
Figure 8:
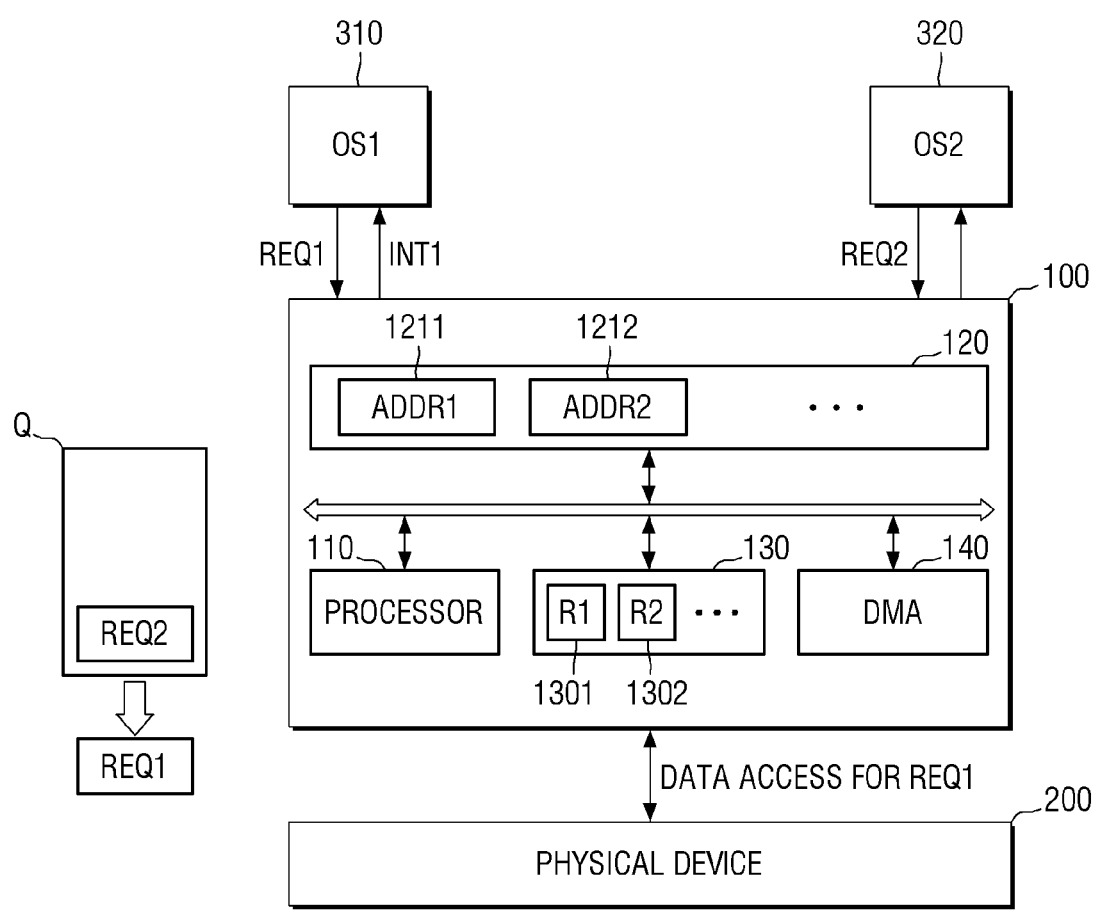
FIGS. 8 and 9 are block diagrams for explaining the operation of the semiconductor device of FIG. 7.
Figure 9:
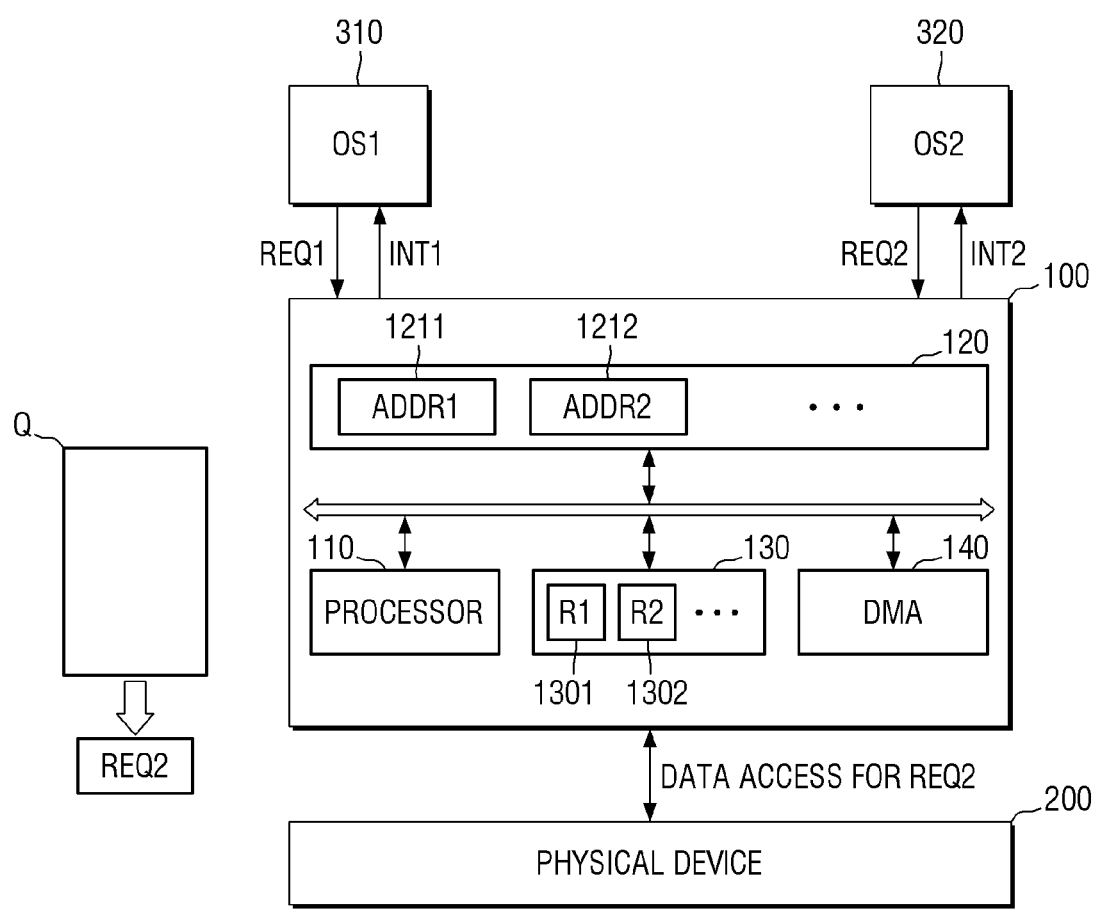

FIG. 7 is a block diagram for describing the semiconductor device 100 according to another embodiment of the present disclosure, and FIGS. 8 and 9 are block diagrams for explaining the operation of the semiconductor device of FIG. 7.

Referring to FIG. 7, the semiconductor device 100 differs from the embodiment of FIG. 2 in that the internal memory 130 electrically connected to the SFR 120 stores the information R1 on the first input/output request REQ1 and the information R2 on the second input/output request REQ2.

Specifically, the first address ADDR1 of the internal memory 130 is stored in the first region 1211 of the SFR 120. Further, the information R1 on the first input/output request REQ1 is stored in a region 1301 accessible at the first address ADDR1 of the internal memory 130. By storing the information R1 on the first input/output request REQ1 in the region 1301 accessible at the first address ADDR1, the first guest operating system 310 may access the physical device 200 by means of the first input/output request REQ1.

On the other hand, a second address ADDR2 of the internal memory 130 is stored in the second region 1212 of the SFR 120. Information R2 on the second input/output request REQ2 is stored in a region 1302 accessible at the second address ADDR2 of the internal memory 130. By storing the information R2 on the first input/output request REQ2 in the region 1302 accessible at the second address ADDR2, the second guest operating system 310 may access the physical device 200 by means of the second input/output request REQ2.

In FIG. 7, the first guest operating system 310 transmits the first input/output request REQ1 for accessing the physical device 200 to the semiconductor device 100, and the second guest operating system 320 transmits the second input/output request REQ2 for accessing the physical device 200 to the semiconductor device 100.

As a result, the first address ADDR1 of the internal memory 130 is stored in the first region 1211 of the SFR 120, and the second address ADDR2 of the internal memory 130 is stored in the second region 1212. Further, "R1" as information on the first input/output request REQ1 is stored in the region 1301 accessible at the first address ADDR1 of the internal memory 130, and "R2" as information on the second input/output request REQ2 is stored in the region 1302 accessible at the second address ADDR2.

As in the above embodiment, the processor 110 may determine the order of processing between the first input/output request REQ1 and the second input/output request REQ2. Specifically, for example, when a time point at which the information R1 on the first input/output request REQ1 is stored in the region 1301 accessed to the first address ADDR1 of the internal memory 130 is earlier than a time point at which the information R2 on the second input/output request REQ2 is stored in the region 1302 accessed to the second address ADDR2 of the memory 130, the processor 110 may process the first input/output request REQ1 earlier than the second input/output request REQ2.

On the other hand, in the present embodiment, the semiconductor device 100 may further include a direct memory access (DMA) 140 which processes the data transfer between the SFR 120 and the internal memory 130. The DMA 140 loads information on the first input/output request REQ1, which is stored in the region 1301 accessible at the first address ADDR1 of the internal memory 130, to the first region 1211 of the SFR 120 so that the processor 110 may receive the first input/output request REQ1 via the SFR 120.

Further, the DMA 140 loads information on the second input/output request REQ2, which is stored in the region 1302 accessible at the second address ADDR2 of the internal memory 130, to the second region 1212 of the SFR 120 so that the processor 110 may receive the second input/output request REQ2 via the SFR 120.

Subsequently, referring to FIG. 8, the processor 110 first processes a first input/output request REQ1 having a higher priority of processing. Subsequently, the first input/output request REQ1 is deleted from the queue Q.

After completing an access to the physical device 200, the processor 110 generates a first interrupt INT1 designated to the first guest operating system 310. Further, the processor 110 provides the first interrupt INT1 generated after processing the first input/output request REQ1 on the physical device 200 to the first guest operating system 310. As the first guest operating system 310 receives the first interrupt INT1, the first guest operating system 310 may recognize that the first input/output request REQ1 is completely processed.

Next, referring to FIG. 9, the processor 110 processes a second input/output request REQ2 having the priority of processing lower than the first input/output request REQ1. Subsequently, the second input/output request REQ2 is deleted from the queue Q.

After completing an access to the physical device 200, the processor 110 generates a second interrupt INT2 designated to the second guest operating system 320. Further, the processor 110 provides a second interrupt INT2, which is generated after processing the second input/output request REQ2 on the physical device 200, to the second guest operating system 320. As the second guest operating system 320 receives the second interrupt INT2, the second guest operating system 320 may recognize that the second input/output request REQ2 is completely processed.

For convenience of explanation, FIGS. 7 to 9 illustrate only two guest operating systems 310 and 320, but the number of guest operating systems is not limited thereto. That is, unlike the illustrated case, the number of guest operating systems may be three or more. As a result, the SFR 120 may be divided to include three or more different regions, and the semiconductor device 100 may generate three or more mutually independent interrupts.

In this way, the semiconductor device 100 according to an embodiment of the present disclosure defines a plurality of regions 1201 and 1202 allocated separately for each of the guest operating systems 310 and 320 inside the SFR 120, and independently provides a plurality of interrupts INT1 and INT2 designated separately for each of the guest operating systems 310 and 320 to the guest operating system, thereby providing a full-virtualization technique in which the implementation complexity and cost are lowered.

Figure 10:
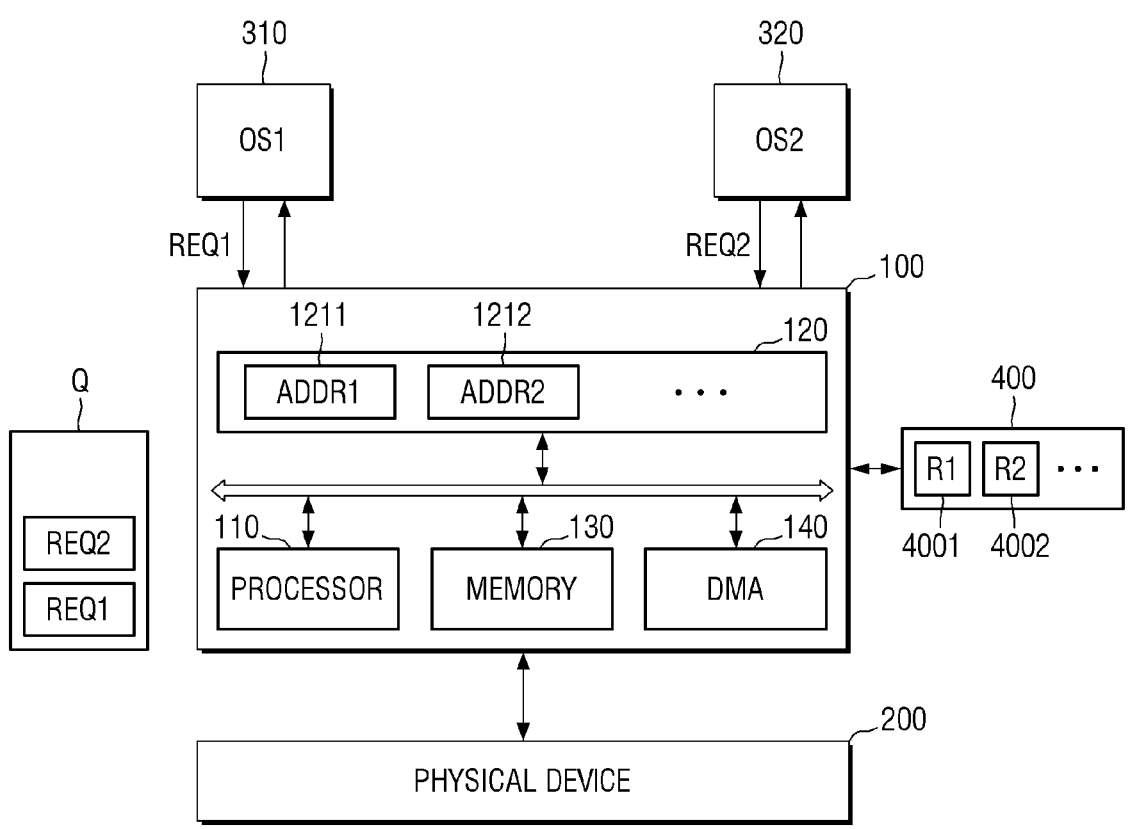
FIG. 10 is a block diagram for explaining a semiconductor device according to an embodiment of the present disclosure.
Figure 11:
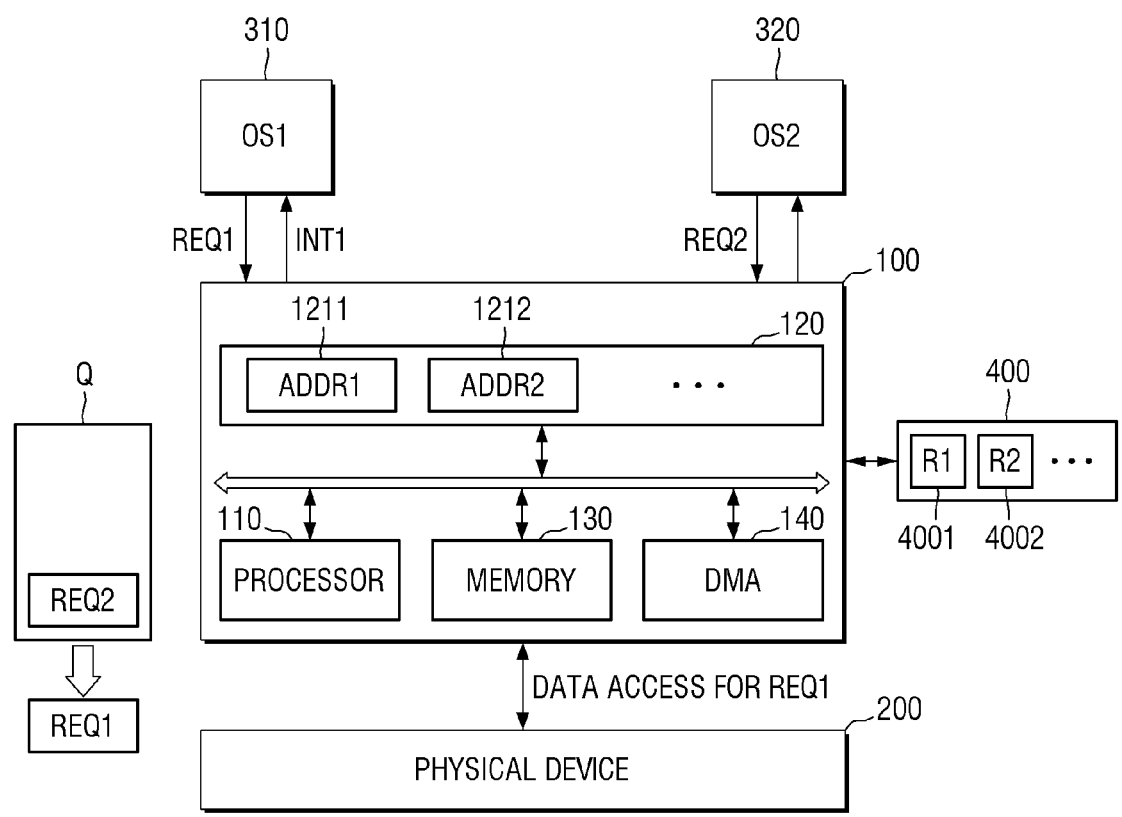
FIGS. 11 and 12 are block diagrams for explaining the operation of the semiconductor device of FIG. 10.
Figure 12:
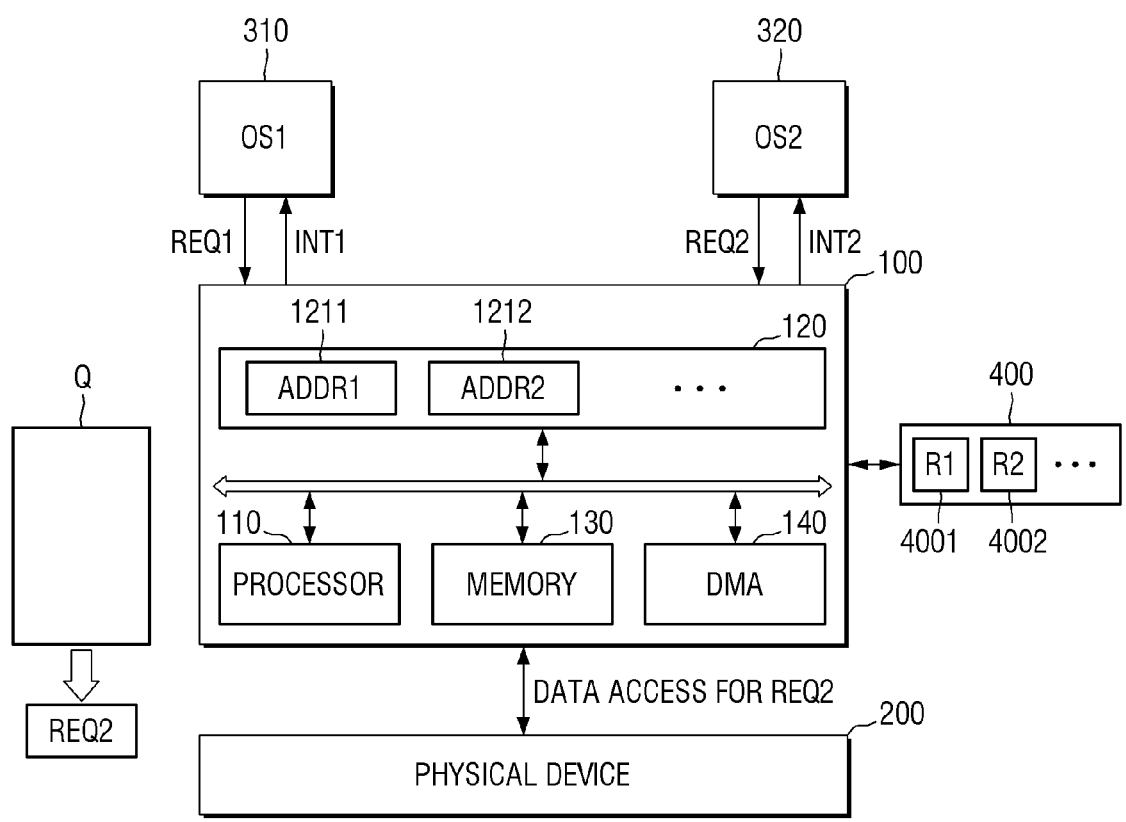

FIG. 10 is a block diagram for explaining a semiconductor device according to another embodiment of the present disclosure, and FIGS. 11 and 12 are block diagrams for explaining the operation of the semiconductor device of FIG. 10.

Referring to FIG. 10, the semiconductor device 100 differs from the embodiment of FIG. 2 in that an external memory 400 electrically connected to the SFR 120 stores the information R1 on the first input/output request REQ1 and information R2 on the second input/output request REQ2.

Specifically, the first address ADDR1 of the external memory 400 is stored in the first region 1211 of the SFR 120. Further, information R1 on the first input/output request REQ1 is stored in a region 4001 accessible at the first address ADDR1 of the external memory 400. By storing the information R1 on the first input/output request REQ1 in the region 4001 accessible at the first address ADDR1, the first guest operating system 310 may access the physical device 200 by means of the first input/output request REQ1.

Subsequently, the second address ADDR2 of the external memory 400 is stored in the second region 1212 of the SFR 120. Further, information R2 on the second input/output request REQ2 is stored in a region 4002 accessible at the second address ADDR2 of the external memory 400. By storing the information R2 on the first input/output request REQ2 in the region 4002 accessible at the second address ADDR2, the second guest operating system 310 may access the physical device 200 by means of the second input/output request REQ2.

In FIG. 10, the first guest operating system 310 transmits the first input/output request REQ1 for accessing the physical device 200 to the semiconductor device 100, and the second guest operating system 320 transmits the second input/output request REQ2 for accessing the physical device 200 to the semiconductor device 100.

As a result, the first address ADDR1 of the external memory 400 is stored in the first region 1211 of the SFR 120, and the second address ADDR2 of the external memory 400 is stored in the second region 1212. "R1" as information on the first input/output request REQ1 is stored in the region 4001 accessible at the first address ADDR1 of the external memory 400, and "R2" as information on the second input/output request REQ2 is stored in the region 4002 accessible at the second address ADDR2.

As in the above embodiment, the processor 110 may determine the order of processing of the first input/output request REQ1 and the second input/output request REQ2. Specifically, for example, when a time point at which the information R1 on the first input/output request REQ1 is stored in the region 4001 accessible at the first address ADDR1 of the external memory 400 is earlier than a time point at which the information R2 on the second input/output request REQ2 is stored in the region 4002 accessible at the second address ADDR2 of the memory 140, the processor 110 may process the first input/output request REQ1 earlier than the second input/output request REQ2.

On the other hand, in the present embodiment, the semiconductor device 100 may further include a DMA 140 for processing the data transfer between the SFR 120 and the external memory 400. The DMA 140 loads information on the first input/output request REQ1, which is stored in the region 4001 accessible at the first address ADDR1 of the external memory 400, to the first region 1211 of the SFR 120 so that the processor 110 may receive the first input/output request REQ1 via the SFR 120. Further, the DMA 140 loads information on the second input/output request REQ2, which is stored in the region 4002 accessible at the second address ADDR2 of the external memory 400, to the second region 1212 of the SFR 120 so that the processor 110 may receive the second input/output request REQ2 via the SFR 120.

Subsequently, referring to FIG. 11, the processor 110 first processes the first input/output request REQ1 having a higher priority of processing. Subsequently, the first input/output request REQ1 is deleted from the queue Q.

After completing an access to the physical device 200, the processor 110 generates a first interrupt INT1 designated to the first guest operating system 310. Further, the processor 110 provides the first interrupt INT1, which is generated after processing the first input/output request REQ1 on the physical device 200, to the first guest operating system 310. As the first guest operating system 310 receives the first interrupt INT1, the first guest operating system 310 may recognize that the first input/output request REQ1 is completely processed.

Next, referring to FIG. 12, the processor 110 processes a second input/output request REQ2 having the priority of processing lower than the first input/output request REQ1. Subsequently, the second input/output request REQ2 is deleted from the queue Q.

After completing an access to the physical device 200, the processor 110 generates a second interrupt INT2 designated to the second guest operating system 320. Further, the processor 110 provides a second interrupt INT2, which is generated after processing the second input/output request REQ2 on the physical device 200, to the second guest operating system 320. As the second guest operating system 320 receives the second interrupt INT2, the second guest operating system 320 may recognize that the second input/output request REQ2 is completely processed.

Although only two guest operating systems 310 and 320 are illustrated in FIGS. 10 to 12 for convenience of explanation, the number of guest operating systems is not limited thereto. That is, unlike the illustrated case, the number of guest operating systems may be three or more. As a result, the SFR 120 may be divided to include three or more different regions, and the semiconductor device 100 may generate three or more mutually independent interrupts.

In this way, the semiconductor device 100 according to an embodiment of the present disclosure defines a plurality of regions 1201 and 1202 allocated separately for each of the guest operating systems 310 and 320 inside the SFR 120, and independently provides a plurality of interrupts INT1 and INT2 designated separately for each of the guest operating systems 310 and 320 to the guest operating system, thereby providing the full-virtualization technique in which the implementation complexity and cost are lowered.

Figure 13:
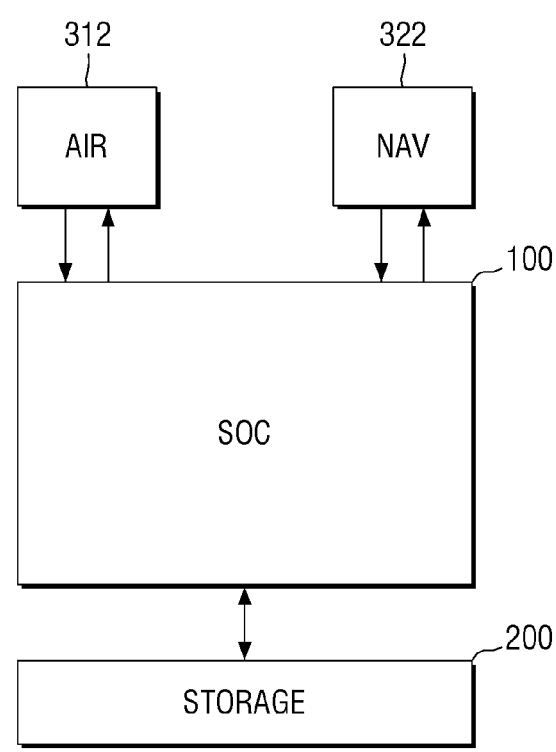
FIG. 13 is a block diagram for explaining a semiconductor device according to an embodiment of the present disclosure.

FIG. 13 is a block diagram for explaining a semiconductor device according to still another embodiment of the present disclosure.

Referring to FIG. 13, a semiconductor device 100 according to still another embodiment of the present disclosure may be implemented as a system-on-chip (SOC) used in an automotive environment as an implementation example. The physical device 200 may be implemented as a storage device such as a Secure Digital (SD) memory card.

In such a case, the first guest operating system 312 may be, for example, a guest operating system for controlling an air conditioning system, and the second guest operating system 322 may be, for example, a guest operating system for controlling a navigation system.

In an environment in which the number of guest operating systems is relatively limited as in such an automotive environment, it is possible to provide the full-virtualization technique with the implementation complexity and cost lowered so that the first guest operating system 312 for an air conditioning system and the second guest operating system 322 for a navigation system may share the physical device 200, using the semiconductor device 100 according to various embodiments of the present disclosure described above.

Furthermore, when the manufacturers of the air conditioning system, the navigation system and the semiconductor device 100 are different from each other, since the manufacturers of the air conditioning system and the navigation system do not have to separately manufacture the semiconductor device 100 or the physical device 200, cost reduction may be achieved.

It should be noted, however, that this embodiment illustrates only an example implementation of the semiconductor device 100 according to various embodiments of the disclosure described above. It should be noted that the semiconductor device 100 according to various embodiments of the present disclosure is applicable to any device and environment that require the virtualization technique.

In concluding the detailed description, those skilled in the art will appreciate that many variations and modifications may be made to the preferred embodiments without substantially departing from the principles of the present disclosure. Therefore, the disclosed preferred embodiments of the disclosure are used in a generic and descriptive sense only and not for purposes of limitation.

What is claimed is:

1. A semiconductor device comprising:
   a processor configured to provide a virtualization function for a physical device to a first guest operating system and a second guest operating system; and
   a special function register (SFR) electrically connected to the processor, the SFR comprising a first region allocated to the first guest operating system and a second region allocated to the second guest operating system,
   wherein first information indicating a first data access request among a data read request and a data write request provided from the first guest operating system is stored in the first region, and second information indicating a second data access request among a data read request and a data write request provided from the second guest operating system is stored in the second region, and
   wherein the processor is further configured to generate a first interrupt and a second interrupt designated to the first guest operating system and the second guest operating system, respectively, in response to the first data access request and the second data access request.

2. The semiconductor device of claim 1, wherein the processor is further configured to:
   provide the first interrupt to the first guest operating system after processing the first data access request on the physical device, and
   provide the second interrupt to the second guest operating system after processing the second data access request on the physical device.

3. The semiconductor device of claim 1, wherein when a time point at which the first information on the first data access request is stored in the first region of the SFR is earlier than a time point at which the second information on the second data access request is stored in the second region, the processor first processes the first data access request earlier than the second data access request.

4. The semiconductor device of claim 3, wherein the processor is further configured to determine a priority of processing of the first data access request and the second data access request, using a queue.

5. The semiconductor device of claim 4, wherein the first data access request is first inserted into the queue, earlier than the second data access request.

6. The semiconductor device of claim 4, wherein the first data access request is first deleted from the queue earlier than the second data access request, and
   the processor processes the first data access request on the physical device to provide the first interrupt to the first guest operating system, and then,
   the processor processes the second data access request on the physical device to provide the second interrupt to the second guest operating system.

7. A semiconductor device comprising:
a processor configured to provide a virtualization function for a physical device to a first guest operating system and a second guest operating system;
a special function register (SFR) electrically connected to the processor, the SFR comprising a first region allocated to the first guest operating system and a second region allocated to the second guest operating system; and
an internal memory electrically connected to the SFR,
wherein a first address of the internal memory is stored in the first region and a second address of the internal memory different from the first address is stored in the second region,
first information indicating a first data access request from the first guest operating system among a data read request and a data write request is stored in a region accessible at the first address of the internal memory,
second information indicating a second data access request from the second guest operating system among a data read request and a data write request is stored in a region accessible at the second address of the internal memory, and
the processor generates a first interrupt and a second interrupt designated to each of the first guest operating system and the second guest operating system, respectively, in response to the first data access request and the second data access request.

8. The semiconductor device of claim 7, wherein the processor is further configured to:
provide the first interrupt to the first guest operating system after processing the first data access request on the physical device, and
provide the second interrupt to the second guest operating system after processing the second data access request on the physical device.

9. The semiconductor device of claim 7, wherein when a time point at which the first information on the first data access request is stored in a region accessible at the first address of the internal memory is earlier than a time point at which the second information on the second data access request is stored in a region accessible at the second address of the internal memory, the processor processes the first data access request earlier than the second data access request.

10. The semiconductor device of claim 9, wherein the processor determines a priority of processing of the first data access request and the second data access request, using a queue.

11. The semiconductor device of claim 10, wherein the first data access request is first deleted from the queue earlier than the second data access request, and
the processor processes the first data access request on the physical device to provide the first interrupt to the first guest operating system, and then,
the processor processes the second data access request on the physical device to provide the second interrupt to the second guest operating system.

12. The semiconductor device of claim 7, further comprising:
a DMA which processes a data transfer between the SFR and the internal memory,
wherein the DMA loads the first information on the first data access request stored in the region, which is accessible at the first address of the internal memory, to the first region of the SFR, and
the DMA loads the second information on the second data access request stored in the region, which is accessible at the second address of the internal memory, to the second region of the SFR.

13. A semiconductor device comprising:
a processor configured to provide a virtualization function for a physical device to a first guest operating system and a second guest operating system;
a special function register (SFR) electrically connected to the processor and comprising a first region allocated to the first guest operating system and a second region allocated to the second guest operating system; and
an external memory electrically connected to the SFR,
wherein a first address of the external memory and a second address of the external memory different from the first address are stored in the first region and the second region,
wherein first information indicating a first data access request from the first guest operating system among a data read request and a data write request is stored in a region accessible at the first address of the external memory,
wherein second information indicating a second data access request from the second guest operating system among a data read request and a data write request is stored in a region accessible at the second address of the external memory, and
wherein the processor is further configured to generate a first interrupt and a second interrupt designated to each of the first guest operating system and the second guest operating system, respectively, in response to the first data access request and the second data access request.

14. The semiconductor device of claim 13, wherein the processor is further configured to:
provide the first interrupt to the first guest operating system after processing the first data access request on the physical device, and
provide the second interrupt to the second guest operating system after processing the second data access request on the physical device.

15. The semiconductor device of claim 13, wherein when a time point at which the first information on the first data access request is stored in a region accessible at the first address of the external memory is earlier than a time point at which the second information on the second data access request is stored in a region accessible at the second address of the external memory, the processor processes the first data access request earlier than the second data access request.

16. The semiconductor device of claim 15, wherein the processor is further configured to determine a priority of processing of the first data access request and the second data access request, using a queue.

17. The semiconductor device of claim 16, wherein the first data access request is first deleted from the queue earlier than the second data access request, and
the processor processes the first data access request on the physical device to provide the first interrupt to the first guest operating system, and then,
the processor processes the second data access request on the physical device to provide the second interrupt to the second guest operating system.

18. The semiconductor device of claim 13, further comprising:
a DMA which processes a data transfer between the SFR and the external memory,
wherein the DMA loads the first information on the first data access request, which is stored in the region accessible at the first address of the external memory, to the first region of the SFR, and the DMA loads the second information on the second data access request stored in the region, which is accessible at the second address of the external memory, to the second region of the SFR.

\* \* \* \* \*